P. C. KUHL.
GAS TURBINE.
APPLICATION FILED AUG. 31, 1915.
1,206,001.
Patented Nov. 28, 1916.
2 SHEETS—SHEET 2.
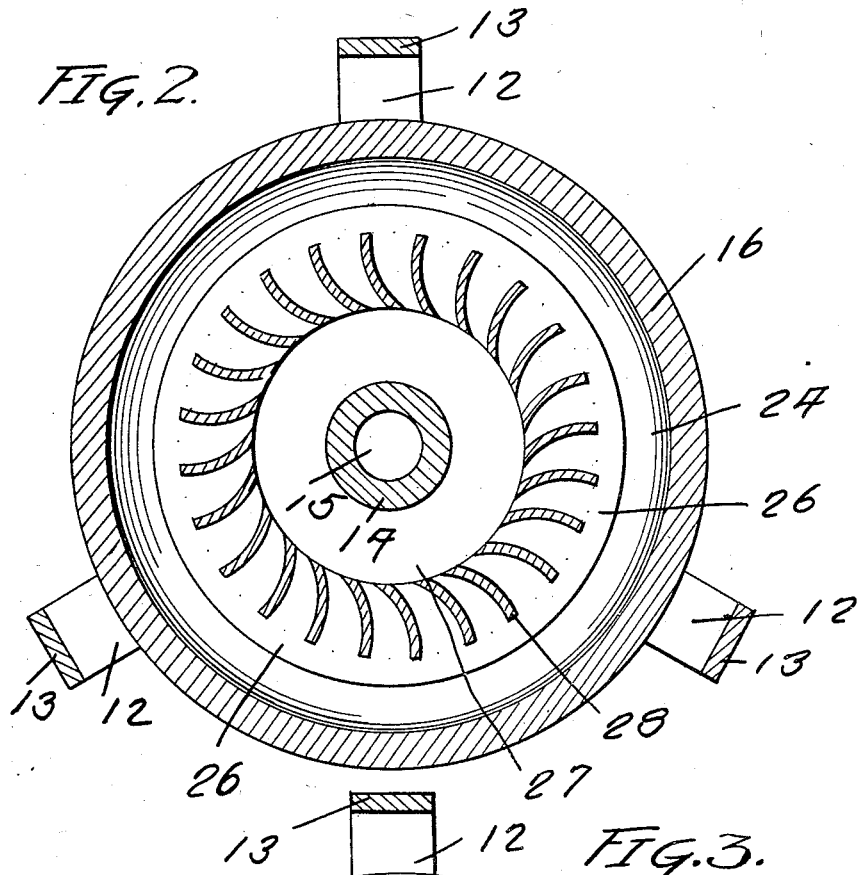
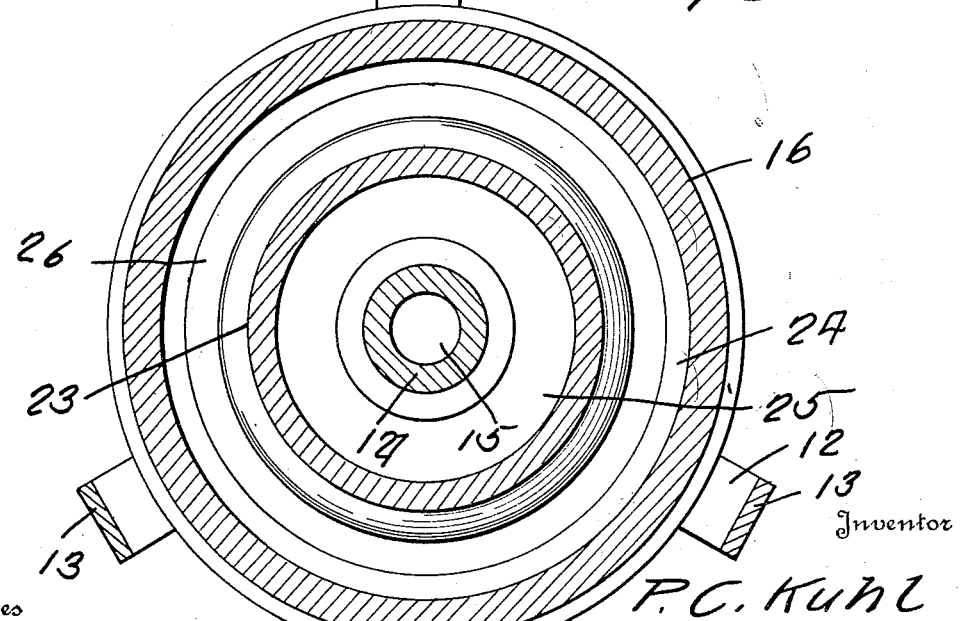

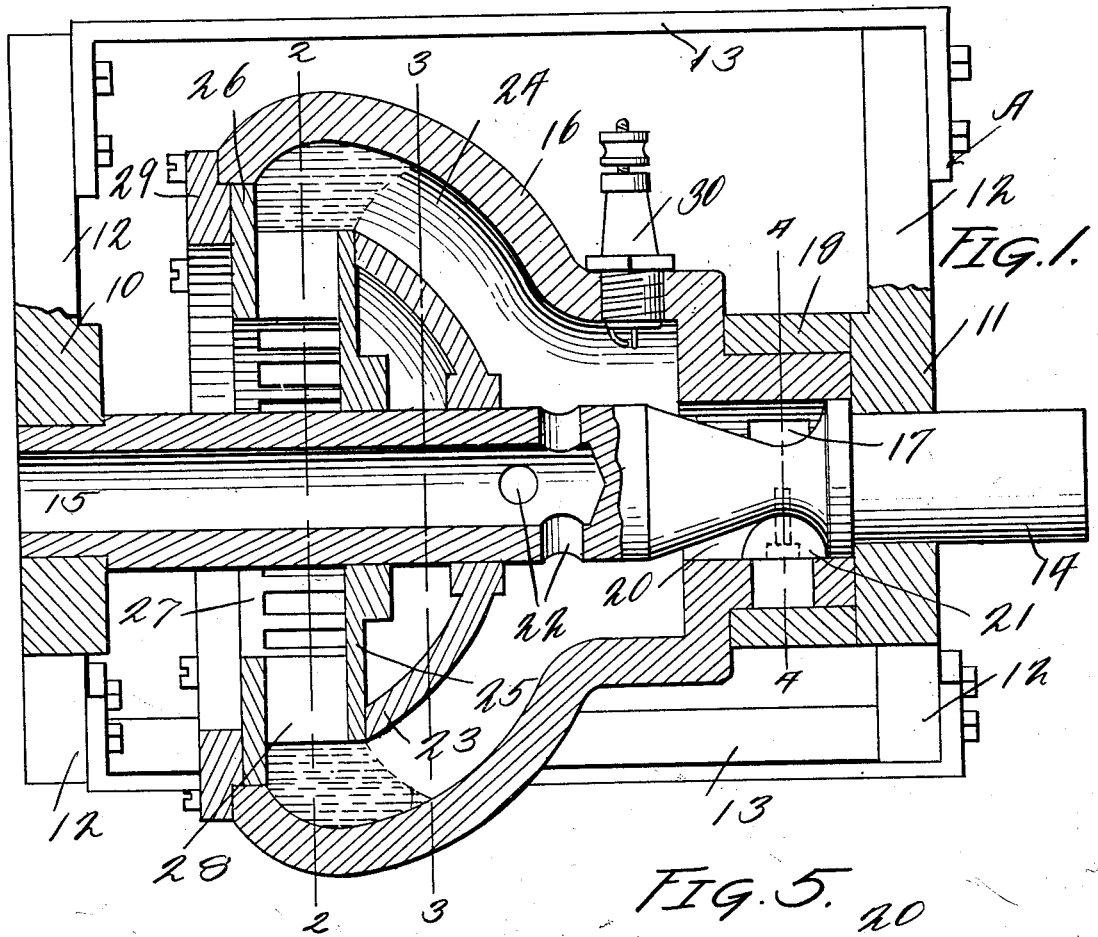
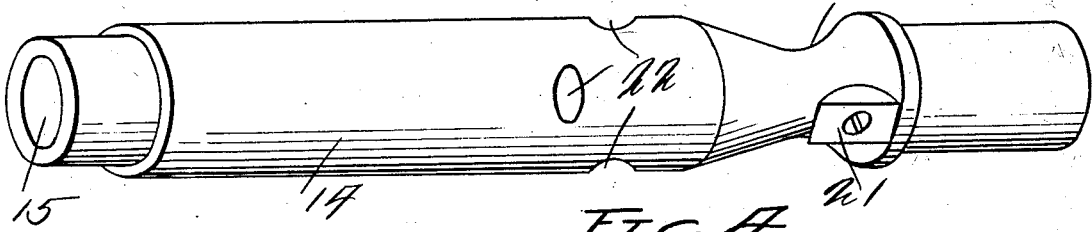
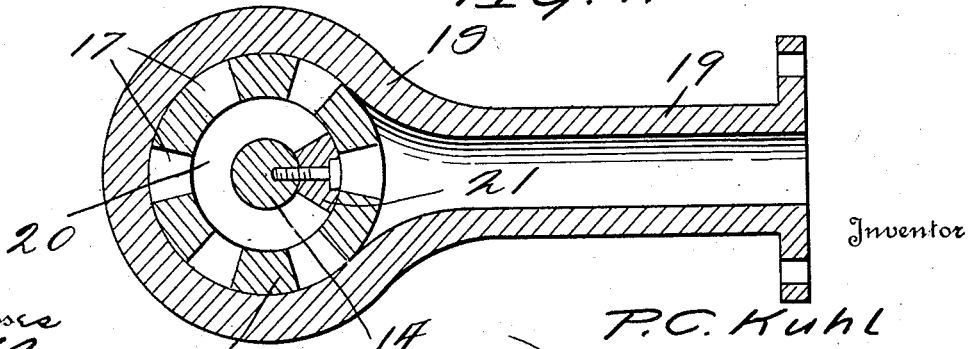

UNITED STATES PATENT OFFICE.

PHILIP C. KUHL, OF LANDUSKY, MONTANA.

GAS-TURBINE.

1,206,001.   Specification of Letters Patent.   Patented Nov. 28, 1916.

Application filed August 31, 1915. Serial No. 48,311.

*To all whom it may concern:*

Be it known that I, PHILIP C. KUHL, a citizen of the United States, residing at Landusky, in the county of Phillips, State of Montana, have invented certain new and useful Improvements in Gas-Turbines; and I do hereby declare the following to be a full, clear, and exact description of the invention, such as will enable others skilled in the art to which it appertains to make and use the same.

This invention relates to gas turbines.

The object of the invention is to provide a turbine wherein the rotating element is actuated by the reaction of water and gas when leaving the turbine wheel.

A further object of the invention is to provide a turbine of the type named which will be simple in construction, efficient in use and which can be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a longitudinal section of a turbine constructed in accordance with the invention; Fig. 2, a section on the line 2—2 of Fig. 1; Fig. 3, a section on the line 3—3 of Fig. 1; Fig. 4, a section on the line 4—4 of Fig. 1, and Fig. 5, a perspective view of the turbine shaft.

Referring to the drawings the turbine is shown as comprising a frame A which includes bearings 10 and 11 from each of which radiate arms 12 and these arms are connected by bars 13. Rotatably mounted in the bearings 10 and 11 is a shaft 14 provided with a longitudinal recess 15 opening through one end of the shaft. Fixed on the shaft 14 is a bell shaped member 16 the minor end of which is recessed as at 17 to form a plurality of mixture pockets. The outer sides of these pockets are closed by a tubular member 18 surrounding the minor end of the member 16 and having a lateral tubular extension 19 fixed to the frame A and adapted to be secured at its outer end to a suitable explosive mixture supply. The shaft 14 is provided with a circumscribing groove 20 in which is mounted a valve 21 adapted to uncover and cover the inner sides of the recesses 17 during rotation of the member 16. This groove 20 has communication with the interior of the member 16 and the valve 21 is positioned so as to cover the recess 17 which is in line with the bore of the extension 19. The interior of the member 16 communicates with the recess 15 through passages 22. Fixed upon the shaft 14 is another bell shaped member 23 which forms in conjunction with the member 16 a combustion chamber 24. The major end of the member 23 is closed by a disk 25 fixed on the shaft 14. Fixed to the member 16 is a disk 26 having a central opening 27. This disk 26 carries on its inner face a plurality of blades 28 which latter in conjunction with the disk 26 and disk 25 form a turbine wheel. The disk 26 is held in place by a ring 29 secured to the major end of the member 16. Any suitable sparking device 30 is mounted in the member 16 and projects into the chamber 24 so as to ignite the explosive mixture in said chamber at the proper time.

In the use of the device water is supplied to the interior of the member 16 through the passage 15 and the passages 22 from any suitable source. As the member 16 is rotated with the shaft 14 the water will move into the plane of the blades 28. The mixture will at the same time enter the recesses 17 successively and then be delivered into the groove 20 as each recess passes the valve 21. This explosive mixture will be intermittently ignited by the sparking device 30 which will result in the water and gases being forced against the blades 28, through opening 27 and through the ring 29. The water and gases during this movement will react upon the blades 28 in the well known manner and effect rotation of the shaft 14 and member 16. It will of course be understood that the shaft 14 can be connected with any suitable device it is required to operate through the instrumentality of the turbine.

Not only can the device be used in the manner described but it will be obvious that the same can be connected to the exhaust pipe of an explosive engine and the exhaust gases of such engine can be utilized to force the water through the blade 28, opening 27 and ring 29 in a manner to effect rotation of the shaft 14 and member 16. When the device is used in connection with the exhaust of an explosive engine it will serve as a means for utilizing energy that is otherwise wasted.

While one particular form of carrying the invention into practice has been illustrated and described it will be obvious that various changes in the details of construction and the arrangement of parts can be resorted to without departing from the scope of the claims.

What is claimed is:—

1. In a turbine, the combination of a frame, a shaft rotatably mounted on the frame, a bell shaped member encircling the shaft and having its minor end fixed thereto, a plurality of blades carried by the member within same and spaced from the shaft, said shaft being provided with a passage communicating at one end with the interior of the member and adapted to convey water into the interior of the member, means for supplying an explosive mixture into the interior of the member and means for intermittently exploding said mixture to force the water and the resulting gases through the blades and out of the member whereby said water and gases will react upon the blades to rotate the member and shaft.

2. In a turbine, the combination of a frame, a shaft rotatably mounted on the frame, a bell shaped member encircling the shaft and having its minor end fixed thereto and provided with a plurality of recesses, a plurality of blades within the member, said shaft being provided with a circumscribing groove communicating with the interior of the member and with said recesses, a tubular member fixed with respect to the frame and surrounding the minor end of the bell shaped member, a lateral extension on said tubular member for conveying an explosive mixture, a valve mounted in said groove and overlying one of said recesses, means for supplying water to the interior of the member, means for intermittently exploding the mixture within the member whereby said water and resulting gases will react upon the blades to rotate the member and shaft.

In testimony whereof, I affix my signature, in the presence of two witnesses.

PHILIP C. KUHL.

Witnesses:
O. P. ANDREWS,
J. T. SPERRY.